(12) United States Patent
Van Mao et al.

(10) Patent No.: US 6,184,167 B1
(45) Date of Patent: Feb. 6, 2001

(54) THERMALLY STABLE MODIFIED ZSM-5 ZEOLITE MATERIALS WITH MICRO POROSITIES AND METHOD OF MAKING SAME

(75) Inventors: Raymond Le Van Mao, Ville St-Laurent; David Ohayon, Montreal, both of (CA)

(73) Assignee: Concordia University, Montreal (CA)

( * ) Notice: Under 35 U.S.C. 154(b), the term of this patent shall be extended for 0 days.

(21) Appl. No.: 09/247,593

(22) Filed: Feb. 10, 1999

Related U.S. Application Data (60) Provisional application No. 60/074,299, filed on Feb. 11, 1998.

(51) Int. Cl.⁷ .................................................. B01J 29/06
(52) U.S. Cl. ............................... 502/64; 502/63; 502/71; 502/77; 502/85
(58) Field of Search .................. 502/63, 64, 71, 502/77, 85; 423/713

(56) References Cited

U.S. PATENT DOCUMENTS

| | | | |
|---|---|---|---|
| 4,503,023 | * | 3/1985 | Breck et al. ........................ 423/328 |
| 4,753,910 | * | 6/1988 | Han et al. ............................. 502/85 |
| 5,100,644 | * | 3/1992 | Skeels et al. ........................ 423/328 |
| 5,271,920 | * | 12/1993 | Chang et al. ........................ 423/700 |
| 5,389,357 | * | 2/1995 | Sato et al. ............................ 423/714 |
| 5,952,259 | * | 9/1999 | Drake et al. ........................... 502/85 |

OTHER PUBLICATIONS

5. R. Le Van Mao, S.T. Le, D. Ohayon, F. Caillibot, L. Gelebart, and G. Denes, Zeolites 19 (1997) 270.
6. R. Le Van Mao, "Zeolite Materials with Enhanced Ion Exchange Capacity", Can. Patent Appl. 2,125,314 (Jun. 7, 1994).
7. A. Ramsaran, PhD Thesis, Concordia University, 1996.
8. G. Hovarth and K. Kawazoe, J. Chem. Eng. Jpn., 16 (1984) 470.
9. W.M. Meier and D.H. Olson, Atlas of Zeolite Structure Types, Ed. by Butterworth–Heinemann (London), (Third Revised Edition, 1992), p. 138–139.
10. G.M. Mavrovouniotis, W.C. Cheng, and A.W. Peters, in Fluid Catalytic Cracking III, Ed. by M.L. Occelli and P.O'Connor, Am. Chem. Soc., Washington DC, (1994), p. 16.
1. R. Le Van Mao, S. Xiao, A. Ramsaran, and J. Yao, J. Mater. Chem., 4(4), (1994), 605.
2. R. Le Van Mao, N.T. Vu, S. Xiao, and A. Ramsaran, J. Mater. Chem., 4(7), (1994), 1143.
3. R. Le Van Mao, A. Ramsaran, S. Xiao, J. Yao, and V. Semmer, J. Mater. Chem., 5(3), (1995), 533.
4. R. Le Van Mao, N. Borsuk, D. Ohayon, A. Ramsaran, S.T. Le and G. Denes, in Advanced Catalytic Materials–1996, Mater. Res. Soc., Symp. Proc., Ed. by P.W. Lednor, M.J. Ledoux, D.A. Nagaki and L.T. Thompson (1997), 73.

\* cited by examiner

*Primary Examiner*—Tom Dunn
(74) *Attorney, Agent, or Firm*—Merek & Voorhees (57) ABSTRACT

Disclosed herein are thermally stable ZSM-5 zeolite materials. The novel materials having substantially uniform micropores narrower (about 0.49 nm) or wider (about 0.55 nm and above) than those of conventional ZSM-5 zeolite (0.52–0.54 nm). Also disclosed is a preparation method (desilication/reinsertion/stabilization or DRS) for converting conventional ZSM-5 zeolite materials to the thermally stable zeolite materials of the present invention. The method of the present invention comprises the steps of sequentially treating ZSM-5 zeolite with aqueous solutions of sodium carbonate and sodium hydroxide to obtain a desilication of the zeolite, reinserting some of the silicon species (mainly sodium orthosilicate and sodium pyrosilicate) which have been selectively removed from the zeolite framework during the desilication operation, and activating the resulting materials in air or in the presence of steam at high temperatures. The amount of the reinserted silicon species depends on the pore size wanted.

13 Claims, 6 Drawing Sheets

THERMALLY STABLE MODIFIED ZSM-5 ZEOLITE MATERIALS WITH MICRO POROSITIES AND METHOD OF MAKING SAME

This Appln claims the benefit of Provisional 60/074,299 filed Feb. 11, 1998.

BACKGROUND OF THE INVENTION

1. Field of the Invention

This invention relates to methods for preparing ZSM-5 zeolite materials.

2. Description of the Prior Art

Zeolites are porous materials having tridimensional networks of micropores. This class of material is key to various industrial processes involving catalysis, ion-exchange and adsorption/separation (molecular sieving) processes. The framework of a normal zeolite contains tetrahedral Si and Al atoms. The Al sites are particularly important for ion exchange processes. This invention is more particularly concerned on the class of zeolite materials known as ZSM-5.

Various methods of preparing or conditioning ZSM-5 zeolites are known in the art. For instance, it is known that controlled desilication (removal of Si tetrahedral sites) of ZSM-5 zeolites by mild caustic leaching decreases the Si/Al ratio (up to 25%) without provoking significant structural collapses or losses of Al tetrahedral sites [1–6]*. Controlling the extent of desilication is achieved by carefully controlling temperature, time and initial pH of the desilicating solution. As general rule, the higher the Si/Al atom ratio of the parent ZSM-5 zeolite, the lower must be the initial pH of the desilicating solution [3].

*Numbers indicated in square brackets refer to art references provided as an appendix to this disclosure.

It is interesting to note that during the desilication operation and during the subsequent water washing of the desilicated zeolite materials, sodium orthosilicate and its dimer, sodium pyrosilicate, are selectively removed from the zeolite framework [5].

As a result of desilication, the density of tetrahedral Al sites is increased. This was reported to improve ion-exchange properties [2,5,6], and catalytic behavior during catalytic dehydration of ethanol [7].

It is also known that thermal treatment [5] or steaming [4] of the desilicated ZSM-5 zeolite further enhances the ion-exchange and the catalytic performances of the materials. Desilicated ZSM-5 when simply dried at 150° C. exhibit new and useful micropores, much narrower than the original ones (about 0.49 nm instead of 0.52–0.54 nm for the parent zeolite) [5].

However, these gains are rapidly erased when the above described zeolite materials are subjected to higher temperatures or steam treatments. Indeed, such treatments render the zeolite material unstable at temperatures lower than 350° C. and causes the appearance of significantly larger pore sizes at temperatures higher than 350° C. All micropores, including the new small micropores (0.49 nm) revert to significantly enlarged micropores (0.55–0.56 nm) upon treatments at high temperatures, in the presence of steam [4] or simply by heating in the air above 350° C. [5]. Such a dependance of micropore size on temperature prevents any commercial application at high temperatures.

It is therefore of utmost importance to develop methods which allow desilicated ZSM-5 zeolite material to achieve high stability and retain their micropore sizes under normal industrial conditions such as the ones found in catalytic cracking processes (high reaction temperatures and frequent regeneration).

In addition, obtaining a stable desilicated ZSM-5 zeolite with a pre-selected micropore size distribution depending on the intended industrial application is a highly coveted goal. Conventional ZSM-5 zeolite materials have a pore size diameter of about 0.52 to 0.54 nm. Obtaining a stable array of smaller diameter pores (about 0.49 nm) or larger diameter pores (about 0.55 or larger) would be quite useful. Indeed with a stable micropore size distribution of smaller or larger micropore sizes, the resulting zeolite could be used as a catalyst capable of expressing shape-selectivity (or molecular sieving effect). This feature being of course different or less pronounced for the parent ZSM-5 zeolite.

Thus, it is the main object of this invention to overcome the drawbacks of the prior art by providing a method for the stabilization of desilicated ZSM-5 zeolites and for selecting micropore size distribution.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

This invention provides novel modified and stabilized ZSM-5 zeolite materials. More specifically, there is provided a thermally stable desilicated ZSM-5 zeolite material having reinserted therein a portion of the silicon species, consisting mainly of sodium orthosilicate and pyrosilicate, previously removed during desilication or obtained from other sources. Advantageously, up to 5% wt of silicon species are reinserted. The amount of silicon species reinserted having a direct effect on the micropore size of the modified zeolite once the zeolite is activated at high temperature with or without steam. A small amount, preferably 0 to 1% wt (based on the initial weight of the desilicated zeolite) of reinserted silicon species will provide a zeolite having micropore sizes in the order of about 0.55 to 0.56 nm. Surprisingly, larger amounts of reinserted silicon species will provide micropore sizes in the order of about 0.49 nm. Yet still larger amounts of reinserted silicon species, namely 4.5% wt or more will provide larger micropore sizes in the order of about at least 0.57 nm.

This invention also provides methods for stabilizing the framework of a desilicated ZSM-5 zeolite which allows the production of thermally stable ZSM-5 zeolites having preselected and uniform micropores sizes ranging in diameter from about 0.49 nm to about 0.55 nm or higher.

In general terms, the method of the present invention comprises the steps of:

a) carrying out a desilication of the ZSM-5 zeolite;

b) recovering the silicon species consisting mainly of sodium orthosilicate and pyrosilicate [hereafter called (O-Si) species] by evaporating to dryness the waters used to wash the desilicated zeolite after completion of the desilication operation; Alternatively, the O-Si species may be obtained from other sources;

c) impregnating the desilicated zeolite with an aqueous solution containing a selected amount of dried (O-Si) species. This (O-Si) amount is equivalent to: a) 1.0 wt % or less, preferably 0% wt (with respect to the desilicated zeolite material) when micropores of 0.55–0.56 nm are wanted; b) 2.0 wt % to 3.0 wt %, preferably 2.5 wt % when micropores of ca. 0.49 nm are wanted; c) 4.5 wt % or more when micropores of 0.57 nm and above are wanted; and then, drying at 120° C.;

d) activating, preferably in air, the resulting material at a temperature preferably higher than 350° C., most preferably at 550° C. or above, or treating the material with steam at preferably 300° C. or above.

The (O-Si) species (sodium orthosilicate and sodium pyrosilicate, mainly) can also be obtained, separately, by desilicating a silicalite (a ZSM-5 zeolite with an extremely high Si/Al atom ratio) and recovering from the washings by evaporation to dryness.

BRIEF DESCRIPTION OF THE DRAWINGS

FIGS. 1a–1d Micropore size distribution [volume of Ar adsorbed in ml/g, $V_p$, versus diameter D, in nm ($10^{-9}$ m)] of:

1a) the parent Na-ZSM5 zeolite activated in the air at 550° C. overnight;

1b) the desilicated Na-DZSM5 zeolite activated in the air at 550° C. overnight;

1c) the Na-DZSM5 (2.5) sample activated in the air at 550° C. overnight;

1d) the Na-DZSM5 (5.0) sample activated in the air at 550° C. overnight.

DETAILED DESCRIPTION OF THE PREFERRED EMBODIMENT

Before describing the present invention in detail, it is to be understood that the invention is not limited in its application to the details of method steps described herein. The invention is capable of other embodiments and of being practiced in various ways. It is also to be understood that the phraseology or terminology used herein is for the purpose of description and not limitation.

The ZSM-5 is an important zeolite whose micropores are said to be in the medium size range when compared to other zeolite materials which may have smaller or larger pores.

Although other zeolite materials may exhibit smaller or larger pore sizes, their applicability in industrial settings is much less advantageous than being able to offer a stable ZSM-5 zeolite having modified pore sizes. This explains the commercial importance of the present invention.

To illustrate the point made in the above paragraph, a bit of background may be helpful. Firstly, shape-selectivity, i.e. selectivity imparted by the pore size of the zeolite materials, is an important factor which can affect significantly adsorptive, diffusive, catalytic or ion-exchanging properties of molecular sieve materials. A difference of a mere 0.03 nm greatly affect the properties of the material.

The possibility of pore size planning provided by the present invention is extremely important because the ZSM-5 zeolite has important industrial applications in catalysis owing to its strong acidity and the possibility of varying the density of its acid sites by varying the Si/Al ratio by synthesis. Indeed, ZSM-5 zeolite materials when used as an additive to a Fluid Cracking Catalyst (FCC), enhance the production of light olefins such as propylene and isobutene. This is due to the unique pore structure and surface chemistry of ZSM-5 materials which do not favor any hydrogen transfer. In constrast hydrogen transfer currently observed with the more open Y-type zeolite catalysts produces less commercially valuable paraffins [10].

Thus, the possibility of producing ZSM-5 zeolite materials with uniform micropore sizes of 0.49 nm or 0.55 nm and higher, from a parent zeolite having two types of micropores of 0.53 nm as average size, means that we are capable now with this invention, of shifting the production of the FCC towards more ethylene/propylene (zeolite micropore size=0.49 nm) or towards isobutene/higher isoolefins (zeolite micropore size=0.55 nm or higher). The latter products being valuable raw materials for the synthesis of various gasoline octane enhancers such as the methyl tertbutyl ether (MTBE) or tertamyl methyl ether (TAME). This is an example of the capabilities of the novel materials, which is by no means limitative in terms of industrial applications.

Common procedures for characterizing the zeolite materials:

It is to be understood that throughout this detailed description, common characterization techniques were used to describe zeolite materials. These common techniques included ascertaining:

i) chemical composition by atomic absorption spectrometry;

ii) structure and the degree of crystallinity by X-ray powder diffraction;

ii) Brunauer-Emmett-Teller (BET), and mesopore-size distribution by adsorption-desorption of nitrogen (temperature of liquid nitrogen, 77 K) using the Micromeretics Model ASAP 2000;

iv) micropore size distribution by adsorption of argon (temperature of liquid argon, 87 K), using the Micromeretics Model 2000 M and the data interpretation of Horvath and Kawazoe [8] modified in terms of interaction parameter by Le Van Mao et al [5];

v) chemical environment of the Si component and the configuration of the Al species, using the technique of solid-state MAS (magic angle sample spinning)-NMR of $^{29}$Si and $^{27}$Al.

EXAMPLE 1

Preparation procedure of the desilicated ZSM-5 zeolite:

In this example, the method of preparing the desilicated ZSM-5 zeolite of the present invention is illustrated using a parent zeolite with a Si/Al atom ratio equal to 20. This method may be modified for variations in the Si/Al ratio atom of the parent zeolite. More specifically, modifications will relate to the concentration of the desilicating aqueous solution. For example, in the case of a parent ZSM-5 zeolite with Si/Al atom ratio=20.5, the desilicating aqueous solution advantageously contains 0.8 M of $Na_2CO_3$+0.01 M of NaOH. For a higher Si/Al atom ratio, e.g. with silicalite which has a Si/Al atom ratio higher than 150, a desilicating aqueous solution of 0.8 M of $Na_2CO_3$ or of below 0.8 M of $Na_2CO_3$ may instead be used. The maximum variation in terms of Si/Al atom ratio or in terms of (Si-O) species removed is limited to 25 to 30 wt % in order not to provoke any irreversible damage to the zeolite structure.

The parent zeolite used was the commercially available ZSM-5 zeolite, provided by Chemie Uetikon, Switzerland (Zeocat PZ 2/30, powder, Na form, Si/Al atom ratio=20.5), hereafter referred to as Na-ZSM5.

Step 1: 109 g of Na-ZSM5 (dried at 120° C.) was treated with 1077 ml of a basic aqueous solution of 0.8 M sodium carbonate containing 0.01 M sodium hydroxide for 4 h at 80° C. with mild stirring. The mixture was allowed to settle, then the supernatant was decanted and a fresh solution of $Na_2CO_3$/NaOH was added. This procedure was repeated twice. Then the solid was filtered, washed with a few milliliters of distilled water, and dried at 120° C. overnight.

Step 2: The resulting solid was then washed on the filter with ca. 10,000 ml of water. The final material, dried at 120° C. overnight (86 g, i.e. a weight loss of 21.2%), had the following chemical composition: Si/Al 17.0; Na/Al=1.0, and is hereafter referred to as Na-DZSM5.

Preparation of the Si-O solid material:

The washing waters of Step 2 of the previously reported procedure were evaporated to dryness in a rotavapor. The resulting solid (dried in an oven at 120° C. overnight) was analyzed by X-ray diffraction, and a search-match was carried out for phase identification [5]. Such a material contained Si species mainly in two forms: sodium orthosilicate and its dimer, sodium pyrosilicate. Only trace amounts of Al containing species were found by atomic absorption.

Such a material hereafter referred to as (Si-O) solid species can also be obtained by evaporation to dryness of the washing waters of the desilicated silicalite (ZSM-5 zeolite with very high Si/Al atom ratio, as mentioned earlier).

Reinsertion and Stabilization:

This invention provides the means to stabilize the micropore network of the desilicated zeolite material. By reinserting a well-defined amount of the (Si-O) species as previously mentioned and activating at high temperatures, it is possible to create a micropore size distribution comprising a first group of uniform micropores of about 0.49 nm and a second group of micropores of about 0.55 nm or more. These two values represent micropore sizes which are respectively smaller and larger than those of the parent ZSM-5 zeolite.

The method for preparing the modified desilicated ZSM-5 zeolites of the present invention is illustrated by the following series of experiments:

5 g of the desilicated ZSM-5 zeolite (Na-DZSM5), dried overnight at 120° C., was impregnated with an aqueous solution of (Si-O) species obtained by dissolving N grams of (Si-O) solid in ca. 7.5 ml of water (Table 1). N represents the various amounts of (Si-O) species used for the reinsertion operation so that the corresponding percentages ranged from 0 to 5 wt %. After thorough agitation, the suspension was left to settle for 1 hour at room temperature, and then gently evaporated to dryness on a hot plate. The resulting material was dried at 120° C. overnight and then activated in the air at 550° C. overnight (unless otherwise specified).

TABLE 1

Amounts of (Si—O) species used for the resinsertion operation [weight of desilicated zeolite (Na-DZSM5) = 5 g for all samples]

| SAMPLES | Amount of (Si—O) added (grams) | Weight % of (Si—O) added |
|---|---|---|
| Na-DZSM5 | 0 | 0 |
| Na-DZSM5 (1.0) | 0.50 | 1.0 |
| Na-DZSM5 (2.0) | 0.100 | 2.0 |
| Na-DZSM5 (2.5) | 0.125 | 2.5 |
| Na-DZSM5 (3.0) | 0.150 | 3.0 |
| Na-DZSM5 (3.5) | 0.175 | 3.5 |
| Na-DZSM5 (4.0) | 0.200 | 4.0 |
| Na-DZSM5 (4.5) | 0.225 | 4.5 |
| Na-DZSM5 (5.0) | 0.250 | 5.0 |

Table 2 reports the surface areas, pore volumes and the micropore size distribution of the zeolites studied. It can be seen that the surface area and the pore volume decreased gradually with increasing amount of (Si-O) species inserted. In particular, the (Si-O) species affect both the micropores (surface area corresponding to the micropores) and the other pores (total surface area).

TABLE 2

BET surface areas, pore volumes and pore sizes of the zeolites investigated (all activated in air at 550° C. overnight)

| Zeolite | Surface area $M^2$/g | Total number of micropores | Pore Volume (cc/g) | Pore Diameter (nm)* |
|---|---|---|---|---|
| Parent Na-ZSM5 | 401 | 292 | 0.322 | 0.52–0.54 |
| Na-DZSM5 | 407 | 296 | 0.360 | 0.55 |
| Na-DZSM5 (1.0) | 397 | 301 | 0.357 | 0.54–0.58 |
| Na-DZSM5 (2.0) | 303 | 219 | 0.305 | 0.0–0.53 |
| Na-DZSM5 (2.5) | 333 | 251 | 0.313 | 0.49 |
| Na-DZSM5 (3.0) | 320 | 239 | 0.314 | 0.53 |
| Na-DZSM5 (3.5) | 296 | 234 | 0.299 | 0.52–0.56 |
| Na-DZSM5 (4.0) | 302 | 232 | 0.301 | 0.53–0.55 |
| Na-DZSM5 (4.5) | 305 | 234 | 0.294 | 0.54–0.57 |
| Na-DZSM5 (5.0) | 286 | 212 | 0.306 | 0.54–0.57 |

* micropore size range is indicated if micropores with different sizes were obtained.

FIGS. 1a to 1d show the distributions of micropore sizes of the zeolite materials studied (all activated at 550° C. overnight). The parent Na-ZSM5 zeolite exhibited two strong distribution peaks with maxima at 0.52 nm and 0.54 nm, respectively (FIG. 1a), which are conform to the data of the literature (actually two types of micropores: sinusoidal channels 0.51–0.55 nm, and straight channels=0.53–0.56 nm [9]).

Figure 1A:
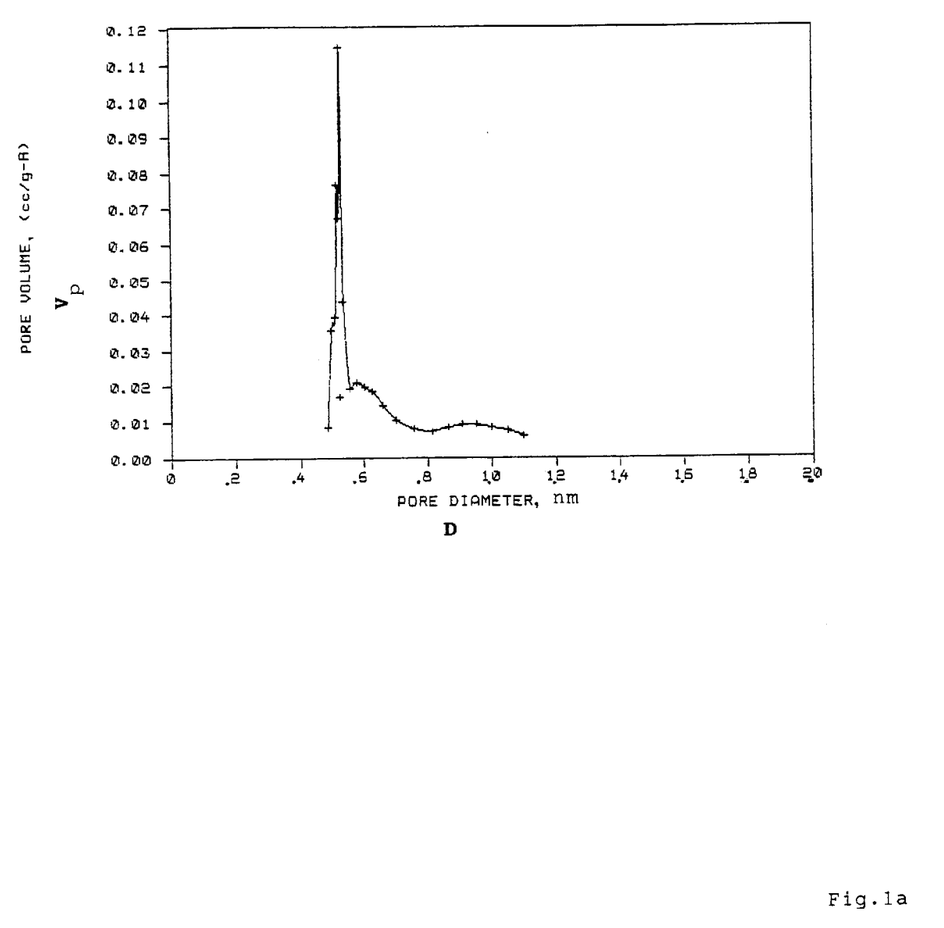
Figure 1B:
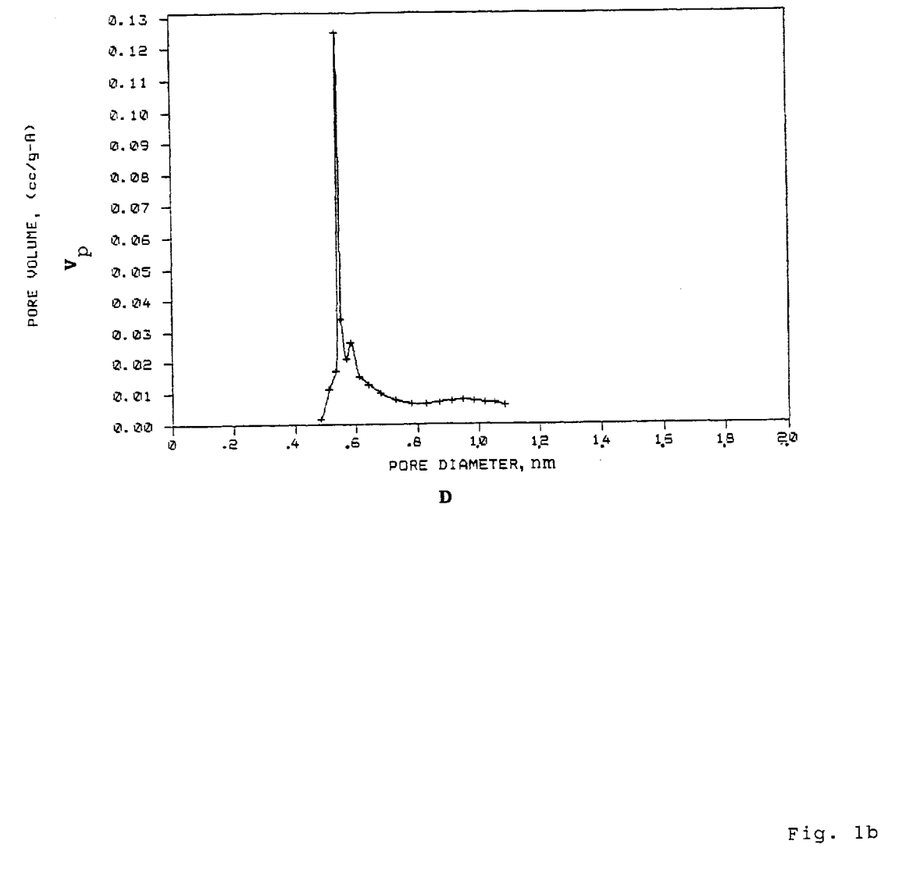
Figure 1C:
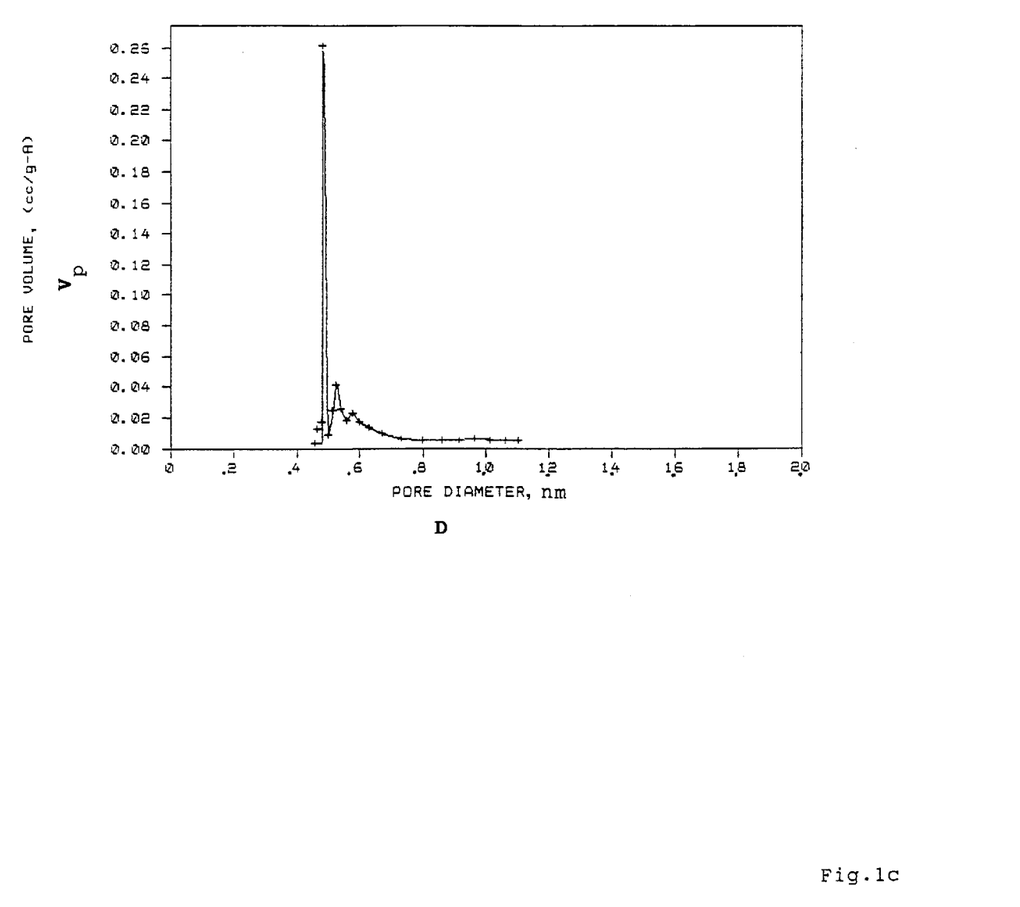
Figure 1D:
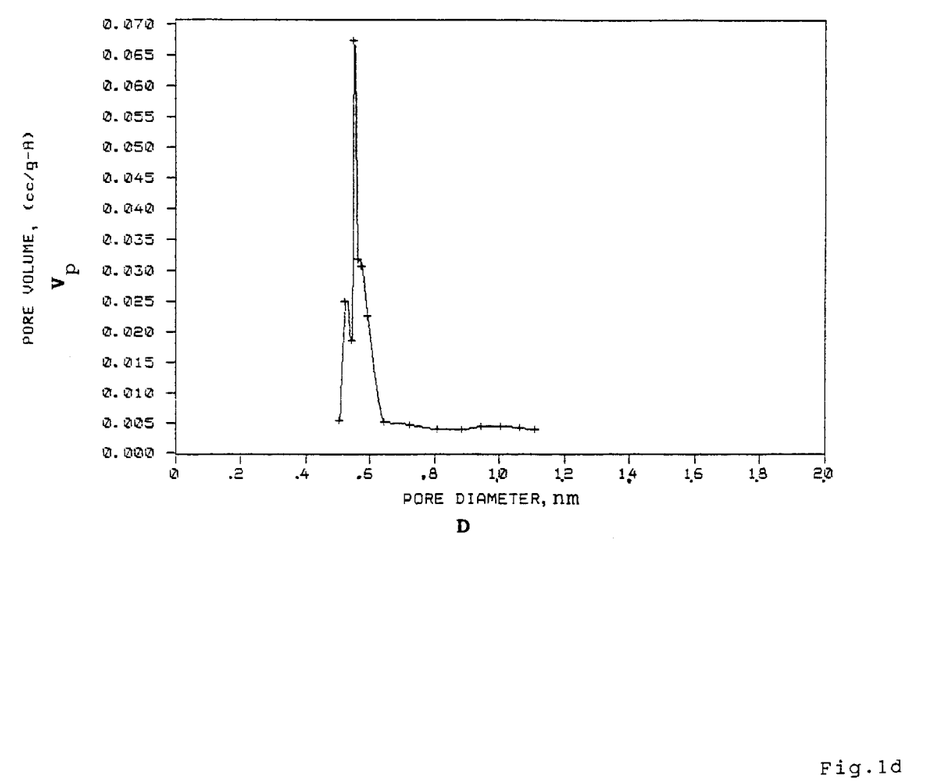

The desilicated sample, activated at 550° C. overnight, showed a very strong peak with the maximum at ca. 0.55 nm (FIG. 1b). The Na-DZSM5 (2.5) showed a very strong peak with the maximum at ca. 0.49 nm (FIG. 1c) while the Na-DZSM5 (5.0) exhibited a strong peak with the maximum at ca. 0.57 nm (FIG. 1d).

Figure 2:
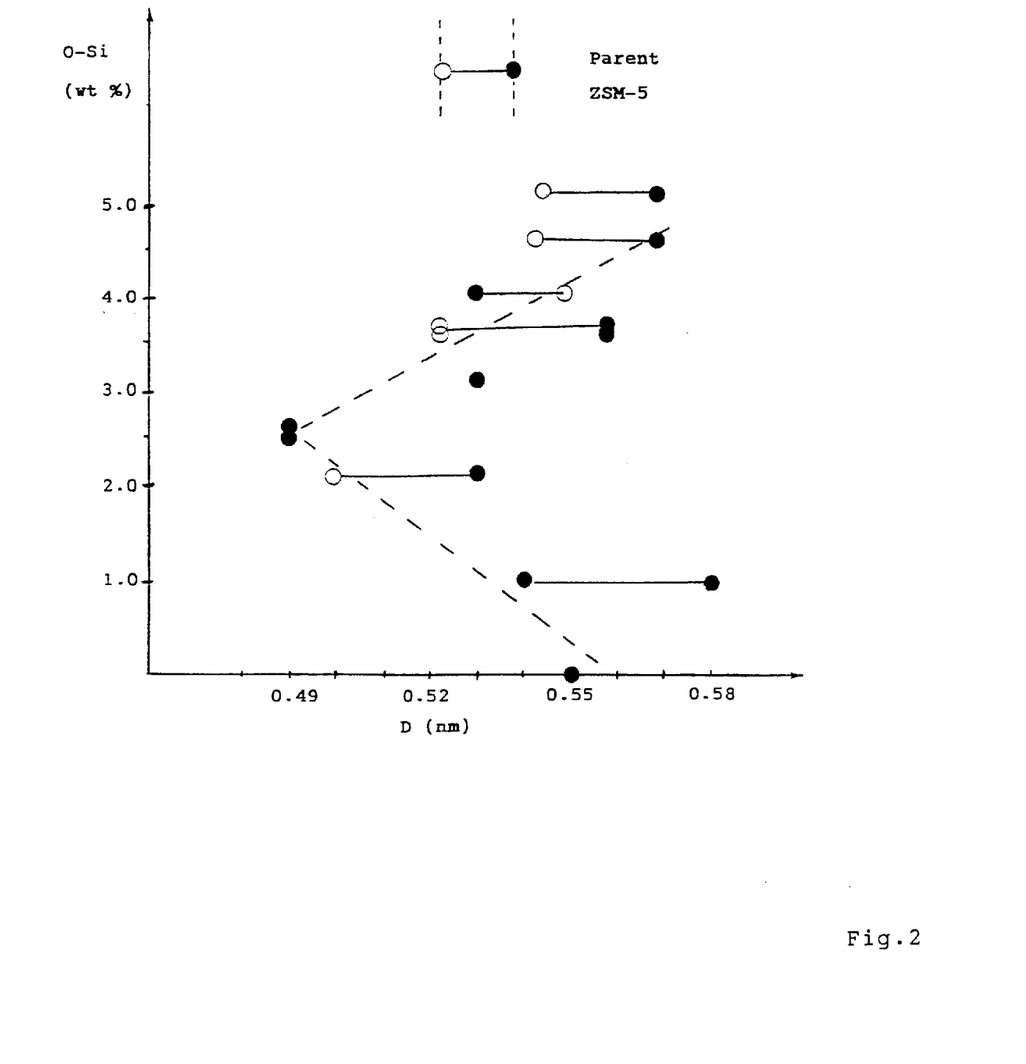
FIG. 2 Variation of the micropore size distribution with the (O-Si) species loading into the desilicated zeolite [(O-Si) in wt % versus diameter, D, in nm ($10^{-9}$ m)]. Full dots indicate the most intense peak(s) of the distribution curve.

FIG. 2 provides a general view of the variation of the sizes of the micropores owing to the reinsertion of the (Si-O) species.

Still referring to FIG. 2, it is very surprising that while the surface areas and the pore volumes decreased gradually with increasing (Si-O) loading, the pore size went through a minimum at 2.5 wt % loading and increased at loading higher than such a value. This is an evidence that the (Si-O) species are not simply deposited onto the surface of the desilicated zeolite but rather reinserted into the framework of the desilicated zeolite. If this were not the case, the micropore size would decrease continuously with increasing (Si-O) loading.

Figure 3:
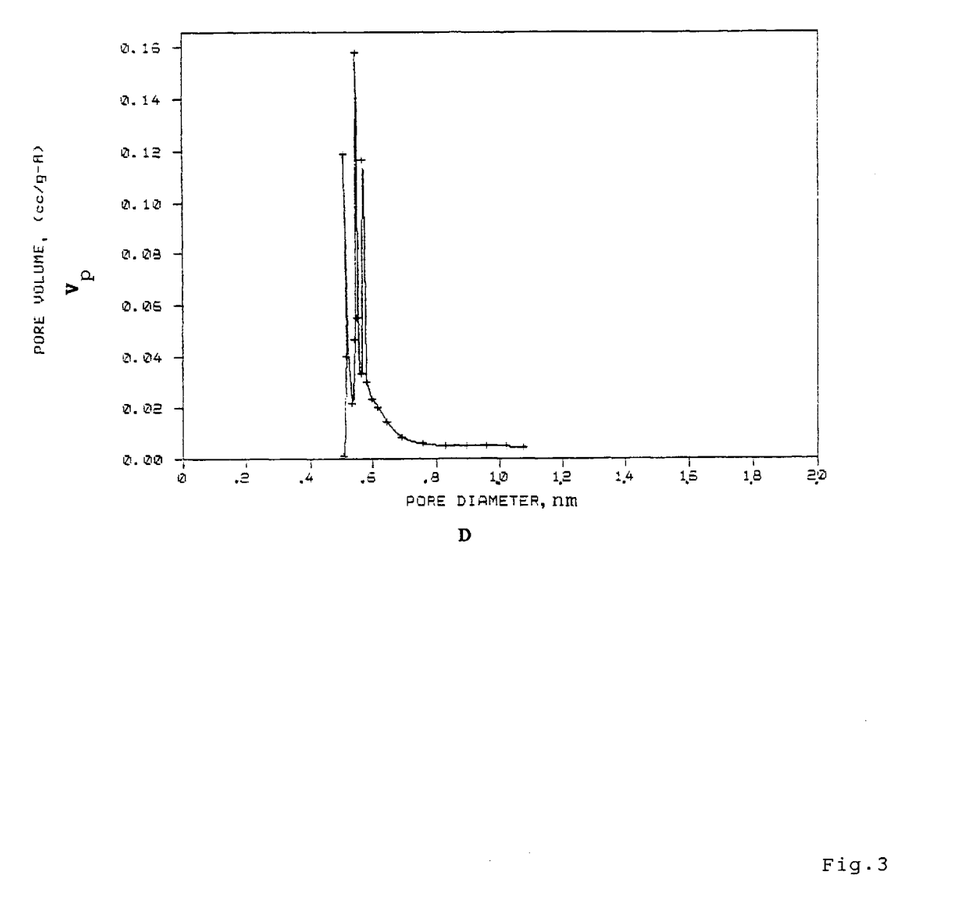
FIG. 3 Micropore size distribution [volume of Ar adsorbed in ml/g, $V_p$, versus diameter D, in nm ($10^{-9}$ m), D] of the Na-DZSM5 (2.5) sample heated at 220° C. overnight.

Thus, the stabilization of the so-modified desilicated zeolite upon activation at high temperatures is due to an intimate reorganisation of the pore network of the zeolite. This is evidenced by the difference in the micropore size distribution between the Na-ZSM5 (2.5) heated at 220° C. (FIG. 3) and the same activated in air at 550° C. (FIG. 1c). In fact, the Na-DZSM5 (2.5) sample evolves from a state with a micropore size distribution comprising several peaks (220 C, FIG. 3) spread over a relatively broad size range to a state with a micropore size distribution of only one peak (550° C., FIG. 1c). This indicates that the framework stabilization of these materials is achieved after insertion of the (Si-O) species. Indeed, the stabilization is achieved by activation of such materials at high temperatures.

Other conclusions may be derived form these data:

if a ZSM-5 zeolite material with micropores larger than 0.57 nm is wanted, the best choice is the Na-DZSM5

(4.5) or Na-DZSM-5 (5.0) activated at high temperatures, such a material still having high surface area and good pore volume (Table 2);

if a ZSM-5 zeolite material with uniform micropores of about 0.55 nm is wanted, the best choice is the Na-DZSM5 activated at high temperatures; and if a ZSM-5 zeolite material with uniform micropores of about 0.49 nm is wanted, the best choice is the Na-DZSM5 (2.5) activated at high temperatures.

EXAMPLE 2

To further illustrate the importance of the final activation of the desilicated and modified ZSM-5 material prepared in accordance with the present invention, the following example is provided. In this example, a desilicated zeolite with a Si/Al atom ratio of about 14 obtained from a conventional Na-ZSM5 with a Si/Al atom ratio of about 19, is activated at 550° C. The activated material displays a 70% higher ion-exchange capacity with $Ca^{2+}$ ions in aqueous solution (30 min of exposure) than the conventional Na-ZSM-5 material.

In contrast, the same desilicated zeolite material prior to activation displayed merely a 28% increase in ion-exchange capacity.

Therefore, this large increase in the ion-exchange properties is ascribed to the final activation step during which an increase of the micropore size took place from 0.52–54 nm (parent zeolite activated at 550° C.) to 0.55–0.56 nm (desilicated zeolite also activated at 550° C.) [5]. This means that a variation of the size of the zeolite micropores of about 0.03 nm had a very significant effect on most of the properties of the materials.

REFERENCES

1. R. Le Van Mao, S. Xiao, A. Ramsaran, and J. Yao, J. Mater. Chem., 4(4), (1994), 605.
2. R. Le Van Mao, N. T. Vu, S. Xiao, and A. Ramsaran, J. Mater. Chem., 4 (7), (1994), 1143.
3. R. Le Van Mao, A. Ramsaran, S. Xiao, J. Yao and V. Semmer, J. Mater. Chem., 5 (3), (1995), 533.
4. R. Le Van Mao, N. Borsuk, D. Ohayon, A. Ramsaran, S. T. Le and G. Denes, in Advanced Catalytic Materials-1996, Mater. Res. Soc., Symp. Proc., Ed. by P. W. Lednor, M. J. Ledoux, D. A. Nagaki and L. T. Thompson (1997), 73.
5. R. Le Van Mao, S. T. Le, D. Ohayon, F. Caillibot, L. Gelebart, and G. Denes, Zeolites 19 (1997) 270.
6. R. Le Van Mao, "Zeolite Materials with Enhanced Ion Exchange Capacity", Can. Patent Appl. 2,125,314 (Jun. 07, 1994).
7. A. Ramsaran, PhD Thesis, Concordia University, 1996.
8. G. Hovarth and K. Kawazoe, J. Chem. Eng. Jpn., 16 (1984) 470.
9. W. M. Meier and D. H. Olson, Atlas of Zeolite Structure Types, Ed. by Butterworth-Heinemann (London), Third Revised Edition, 1992), p 138–139.
10. G. M. Mavrovouniotis, W. C. Cheng, and A. W. Peters, in Fluid Catalytic Cracking III, Ed. by M. L. Occelli and P. O'Connor, Am. Chem. Soc., Washington D.C., (1994), p16.

Although the invention has been described above with respect with one specific form, it will be evident to a person skilled in the art that it may be modified and refined in various ways. It is therefore wished to have it understood that the present invention should not be limited in scope, except by the terms of the following claims.

We claim:

1. A thermally stable desilicated ZSM-5 zeolite material having reinserted therein a portion of up to 5% wt, based on the initial weight of the desilicated ZSM-5 zeolite, of the silicon species, consisting mainly of sodium orthosilicate and pyrosilicate, previously removed during desilication.

2. The zeolite material of claim 1 wherein said material has a substantially uniform micropore diameter of about 0.49 to about 0.51 nm.

3. The zeolite material of claim 2 wherein said substantially uniform micropore diameter size of about 0.49 nm.

4. The zeolite material of claim 1 wherein said material has a substantially uniform micropore diameter of about 0.55 to about 0.57 nm.

5. The zeolite material of claim 1 wherein said material has an amount of 1% wt or less, based on the initial weight of the desilicated ZSM-5 zeolite, of the reinserted silicon species and a substantially uniform micropore diameter of about 0.55 to about 0.56 nm.

6. The zeolite material of claim 1 wherein said material has an amount of 2 to 3% wt, based on the initial weight of the desilicated ZSM-5 zeolite, of the reinserted silicon species and a substantially uniform micropore diameter of about 0.49 nm.

7. The zeolite material of claim 6 wherein the amount of reinserted silicon species is about 2.5% wt.

8. A thermally stable desilicated ZSM-5 zeolite material having reinserted therein a portion of 4.5% wt or more, based on the initial weight of the desilicated ZSM-5 zeolite, of the silicon species, consisting mainly of sodium orthosilicate and pyrosilicate, previously removed during desilication and wherein the zeolite material has a substantially uniform micropore diameter of about at least 0.57 nm.

9. A method for desilicating, modifying and activating a ZSM-5 zeolite material, the method comprising the steps of:

a) desilicating said ZSM-5 zeolite in a solution of sodium carbonate and sodium hydroxide, thereby obtaining a desilicated zeolite by removal of silicon species consisting mainly of sodium orthosilicate and pyrosilicate;

b) recovering the silicon species by evaporating to dryness the waters used to wash the desilicated zeolite after completion of the desilication operation of step a) thereby obtaining dried silicon species;

c) impregnating the desilicated zeolite with an aqueous solution containing a pre-selected amount of the dried silicon species followed by drying to constant weight;

d) activating the resulting material at a temperature of at least about 300° C.

10. The method of claim 9 wherein step d) is conducted in the presence of air and steam.

11. The method of claim 9 wherein step a) is conducted with a solution of sodium carbonate.

12. The method of claim 9 wherein step d) is conducted at a temperature of at least about 550° C.

13. A method for modifying and activating a desilicated ZSM-5 zeolite material, the method comprising the steps of:

a) impregnating the desilicated zeolite with an aqueous solution containing a pre-selected amount of less than about 5% wt of silicon species selected from sodium orthosilicate and pyrosilicate, followed by drying to constant weight;

b) activating in air the resulting material at a temperature of at least about 300° C.

* * * * *